(12) United States Patent
Fennel (10) Patent No.: US 8,910,081 B2
(45) Date of Patent: Dec. 9, 2014

(54) PUSH NOTIFICATIONS FOR UPDATING MULTIPLE DYNAMIC ICON PANELS

(75) Inventor: Theron Thomas Fennel, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 13/084,017

(22) Filed: Apr. 11, 2011

(65) Prior Publication Data
US 2012/0260215 A1  Oct. 11, 2012

(51) Int. Cl.
*G06F 3/048* (2013.01)
*G06F 3/00* (2006.01)
*H04W 4/00* (2009.01)
*G06F 9/44* (2006.01)
*H04W 4/10* (2009.01)

(52) U.S. Cl.
CPC ............. *H04W 4/001* (2013.01); *G06F 9/4443* (2013.01); *H04W 4/10* (2013.01)
USPC ............................ 715/825; 715/751; 715/765

(58) Field of Classification Search
CPC ....... H04W 4/001; H04W 4/10; G06F 9/4443
USPC .......................................... 715/825, 751, 765
See application file for complete search history.

(56) References Cited

U.S. PATENT DOCUMENTS

| | | |
|---|---|---|
| 5,297,032 A | 3/1994 | Trojan et al. |
| 5,321,750 A | 6/1994 | Nadan |
| 5,339,392 A | 8/1994 | Risberg et al. |
| 5,432,932 A | 7/1995 | Chen et al. |
| 5,452,414 A | 9/1995 | Rosendahl et al. |
| 5,819,284 A | 10/1998 | Farber et al. |
| 5,959,621 A | 9/1999 | Nawaz et al. |
| 6,188,405 B1 | 2/2001 | Czerwinski et al. |
| 6,216,141 B1 | 4/2001 | Straub et al. |
| 6,278,448 B1 | 8/2001 | Brown et al. |
| 6,311,058 B1 | 10/2001 | Wecker et al. |
| 6,330,005 B1 * | 12/2001 | Tonelli et al. ................. 715/735 |

(Continued)

FOREIGN PATENT DOCUMENTS

| | | |
|---|---|---|
| EP | 1798632 A1 | 6/2007 |
| EP | 2017701 A1 | 1/2009 |
| WO | WO 99/26127 | 5/1999 |

OTHER PUBLICATIONS

"Hands-on Lab Using Push Notifications," Windows Phone, Apr. 14, 2011, 68 pages.

(Continued)

*Primary Examiner* — David Phantana Angkool
(74) *Attorney, Agent, or Firm* — John Jardine; Kate Drakos; Micky Minhas (57) ABSTRACT

The present application is directed to push notifications that can be used to dynamically update multiple icon panels. For example, the push notifications can be used to update two or more icon panels associated with the same application or two or more panels (i.e., sides) of a three-dimensional icon. In one embodiment, one or more push notifications can be used to independently update content on the panels. In another embodiment, a user can choose settings to assign panels that are to be updated using push notifications. A third party server can be automatically informed of an identification for the panel so that future push notifications incorporate the identification information.

17 Claims, 10 Drawing Sheets

(56) References Cited

U.S. PATENT DOCUMENTS

| | | |
|---|---|---|
| 6,449,638 B1 | 9/2002 | Wecker et al. |
| 6,456,334 B1 | 9/2002 | Duhault |
| 6,510,553 B1 | 1/2003 | Hazra |
| 6,724,403 B1 | 4/2004 | Santoro et al. |
| 6,807,558 B1 | 10/2004 | Hassett et al. |
| 6,832,355 B1 | 12/2004 | Duperrouzel et al. |
| 6,976,210 B1 | 12/2005 | Silva et al. |
| 7,028,264 B2 | 4/2006 | Santoro et al. |
| 7,376,907 B2 | 5/2008 | Santoro et al. |
| 7,437,676 B1 * | 10/2008 | Magdum et al. ............... 715/738 |
| 7,549,127 B2 * | 6/2009 | Chasen et al. ................ 715/788 |
| 7,930,649 B2 * | 4/2011 | Mysore et al. ................ 715/804 |
| 7,933,632 B2 | 4/2011 | Flynt et al. |
| 7,954,060 B2 * | 5/2011 | Sharma ......................... 715/765 |
| 7,987,431 B2 | 7/2011 | Santoro et al. |
| 8,407,776 B2 * | 3/2013 | Somani et al. .................... 726/9 |
| 8,423,656 B2 * | 4/2013 | Lowry et al. ................. 709/229 |
| 8,548,431 B2 * | 10/2013 | Teng et al. .................... 455/411 |
| 8,554,855 B1 * | 10/2013 | Lowry et al. ................. 709/206 |
| 8,560,959 B2 * | 10/2013 | Zaman et al. ................. 715/765 |
| 8,756,533 B2 * | 6/2014 | Sandler et al. ................ 715/863 |
| 2004/0085345 A1 * | 5/2004 | Galou et al. .................. 345/734 |
| 2004/0243945 A1 * | 12/2004 | Benhase et al. ............... 715/853 |
| 2006/0190833 A1 | 8/2006 | SanGiovanni et al. |
| 2007/0082707 A1 * | 4/2007 | Flynt et al. .................... 455/564 |
| 2009/0305732 A1 | 12/2009 | Marcellino et al. |
| 2010/0274366 A1 | 10/2010 | Fata et al. |
| 2010/0329642 A1 | 12/2010 | Kam et al. |
| 2011/0029598 A1 * | 2/2011 | Arnold et al. ................. 709/203 |
| 2011/0074809 A1 * | 3/2011 | Chen et al. .................... 345/619 |
| 2011/0225547 A1 | 9/2011 | Fong et al. |
| 2014/0210869 A1 * | 7/2014 | Mizushiro ..................... 345/690 |

OTHER PUBLICATIONS

"Apple Push Notification Service," Apple, Inc., Aug. 3, 2010, 11 pages.

"Introduction to the Toast and Tile Notifications for Alerts," Microsoft, 2011, retrieved Apr. 14, 2011, 18 pages.

"Google Mobile App for iPhone gets pushy," Google Mobile Blog, Aug. 23, 2010, 14 pages.

"Dynamic Tile Push Notifications for Windows Phone 7," Zander, Jan. 3, 2011, 6 pages.

International Search Report and Written Opinion dated Oct. 29, 2012, for PCT/US2012/032932, 9 pages.

* cited by examiner

PUSH NOTIFICATIONS FOR UPDATING MULTIPLE DYNAMIC ICON PANELS

FIELD

The present application relates to push notifications and, particularly, to using push notifications to dynamically update icons.

BACKGROUND

Push technology describes a style of Internet-based communication where a request for a given transaction is initiated by a publisher or central server. By contrast, pull technology is where the request for the transmission of information is initiated by a receiver or client. Push services are often based on information preferences expressed in advance, which is often called a publish/subscribe model. In such a model, a client subscribes to various information channels. Whenever new content is available on one of those channels, the server pushes information out to the user.

Synchronous conferencing and instant messaging are typical examples of push services. Chat messages and sometimes files are pushed to the user when they are received by the messaging service. Email is also a well-known push system. In typical Email configurations, an SMTP protocol is used as a push protocol. However, the last step—from mail server to desktop computer—typically uses a pull protocol like POP3 or IMAP. Modern e-mail clients make this step seem instantaneous by repeatedly polling the mail server, frequently checking it for new mail.

Icons are small graphic symbols (usually simple pictures) that denote programs, commands, data files, etc. in a graphical user interface. For example, an icon can be used to launch an application (e.g., open Microsoft® Word®). Dynamic icons are also known. For example, dynamic icons are icons that can be updated, changed or animated. However, an icon is small and the amount of information that can be displayed on the dynamic icon is limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application is directed to push notifications that can be used to dynamically update multiple icon panels. For example, the push notifications can be used to update two or more icon panels associated with the same application or two or more panels (i.e., sides) of a three-dimensional icon.

In one embodiment, separate push notifications can be used to independently update content on the panels. Alternatively, a single push notification that separately identifies the panels can be used.

In another embodiment, a user can choose settings to assign panels that are to be updated using push notifications. A third party server can be automatically informed of an identification for the panel so that future push notifications incorporate the identification information.

The foregoing and other objects, features, and advantages of the invention will become more apparent from the following detailed description, which proceeds with reference to the accompanying figures.

DETAILED DESCRIPTION

Figure 1:
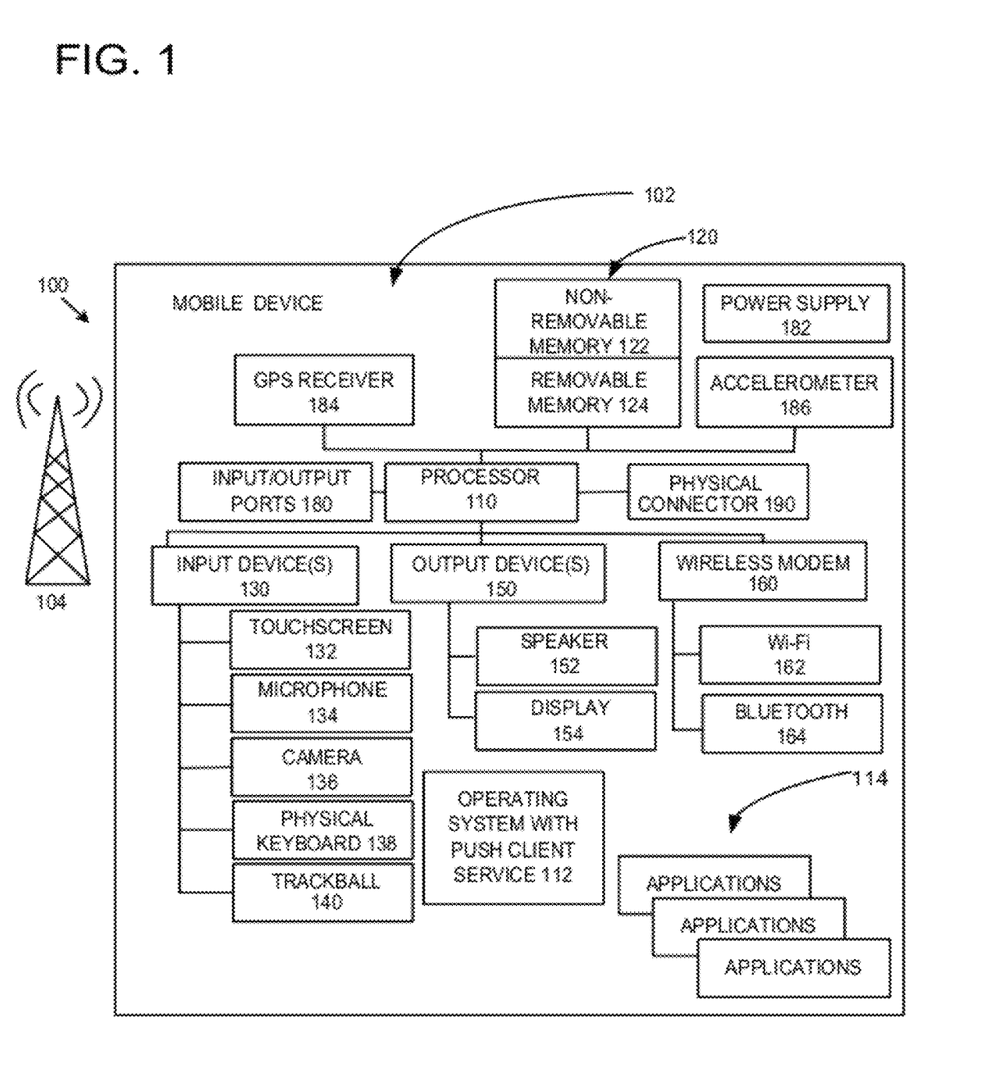
FIG. 1 is an example mobile phone that can be used for updating multiple dynamic icon panels.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The operating system can include a push client service for displaying multiple dynamic icons associated with a single application, as described below. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 2:
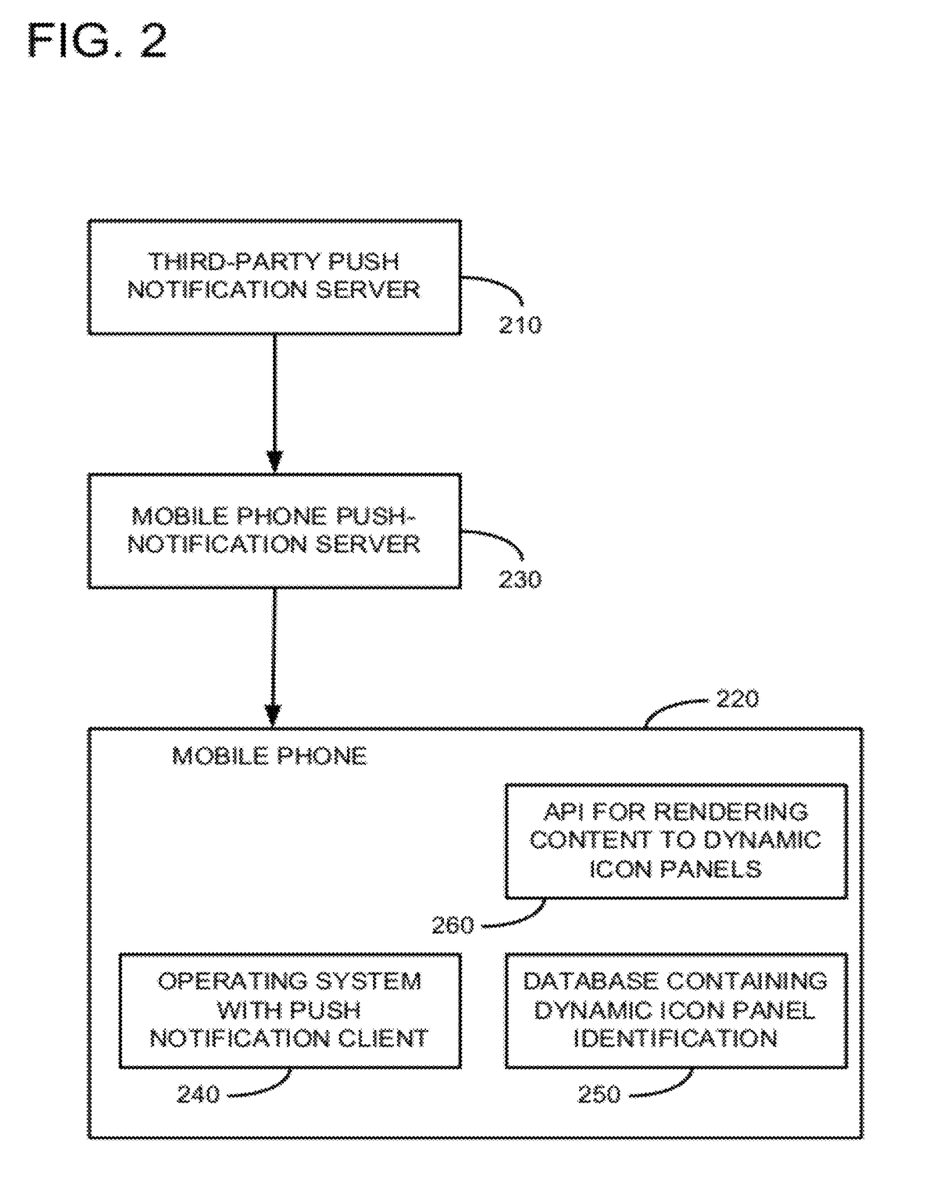
FIG. 2 is an embodiment of a system diagram used for updating multiple dynamic icon panels.

FIG. 2 shows an embodiment of a system that can be used for push notifications. A third-party server 210 can be associated with an application, which is available on a mobile phone 220. The third-party server 210 can send messages via a mobile phone push-notification server 230. The push-notification server 230 merely forwards the push notification to the appropriate mobile phone, as is well-understood in the art. An operating system 240 on the mobile phone 220 includes a push-notification client that receives the push notification. The push notification generally includes, amongst other things, an identification of a panel and content to be updated. The panel is typically associated with a dynamic icon. The push-notification client checks a database 250, which can be positioned locally on the mobile phone, to determine if the identification matches a dynamic icon panel on the mobile phone. The dynamic icon panel is typically displayed as a substantially two-dimensional panel that, generally, cannot be rotated three-dimensionally or that is a two-dimensional portion of a rotatable three-dimensional image. If a match is found, then the push-notification client calls an application programming interface (API) 260 to render content on the panel.

Figure 3:
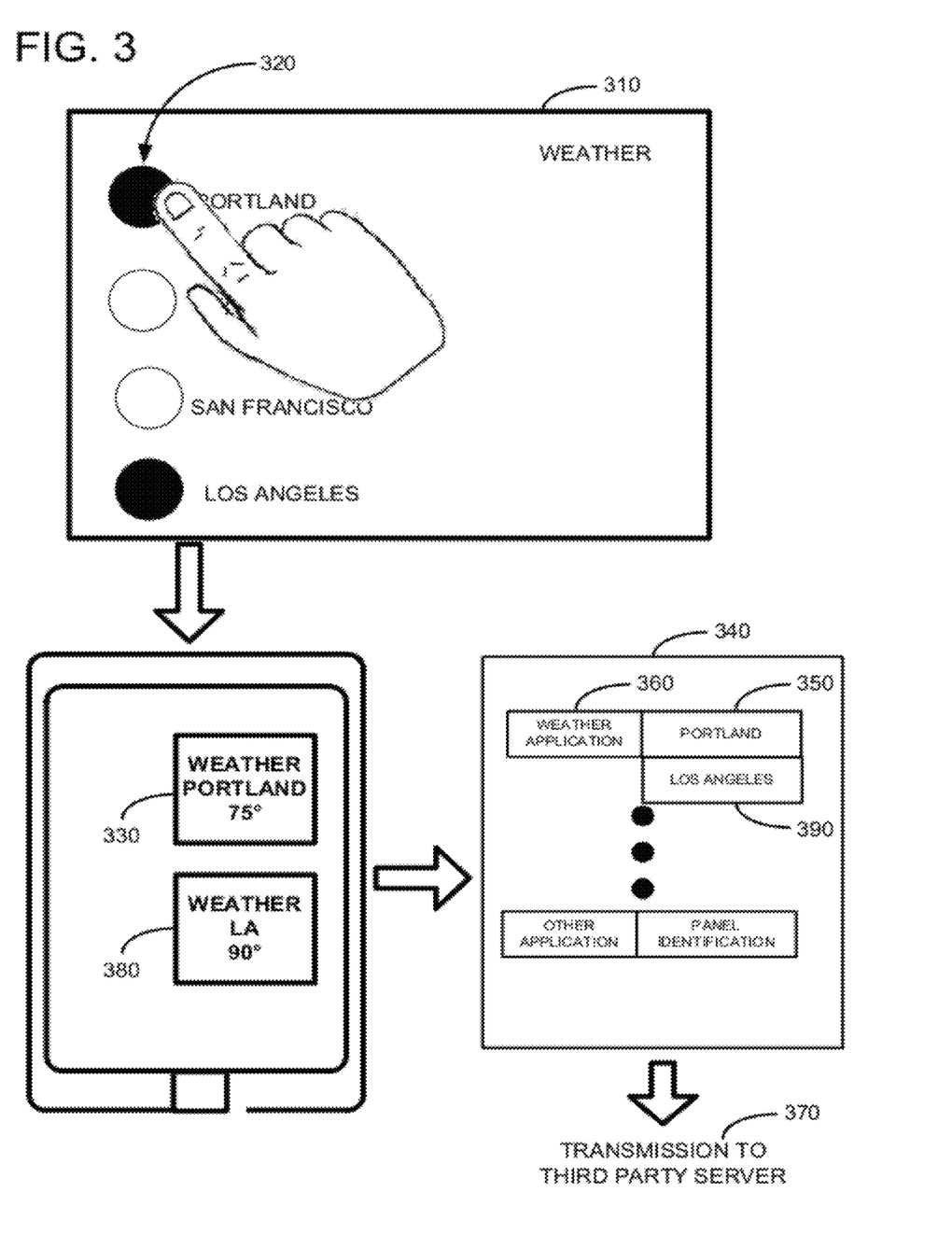
FIG. 3 is an embodiment showing a user assigning panels to be updated.

FIG. 3 shows an example of how multiple panels associated with one application are assigned. An example user interface window 310 associated with a weather application running on the mobile phone can be used to receive user input regarding assigning panels. As shown at 320, the user selects a button associated with a city, such as Portland, to create the assignment. When the assignment is made, a panel, such as panel 330, can be added to the default screen (sometimes called the home screen or start screen) of the user interface. Additionally, a database 340 can be updated to assign the new panel an identification 350 that is linked to the associated application, as shown at 360. The linking can be a sub-field in the database, metadata, a property of the application, etc. There are many different techniques that can be used to identify and link the new panel to the associated application. As shown at 370, the database information can also be transmitted to a third-party server so that the third-party server can use the identification information in a push notification. For example, if the third-party server issues a weather update for Portland, the identification 350 can be used to independently update the Portland panel 330. A second panel 380, which is also associated with the same application 360, also has an identification 390. Both panels 330 and 380 can have independent content and can be updated at different times and with different content. Thus, the push-notification server can update dynamic icon panels independently.

Figure 4:
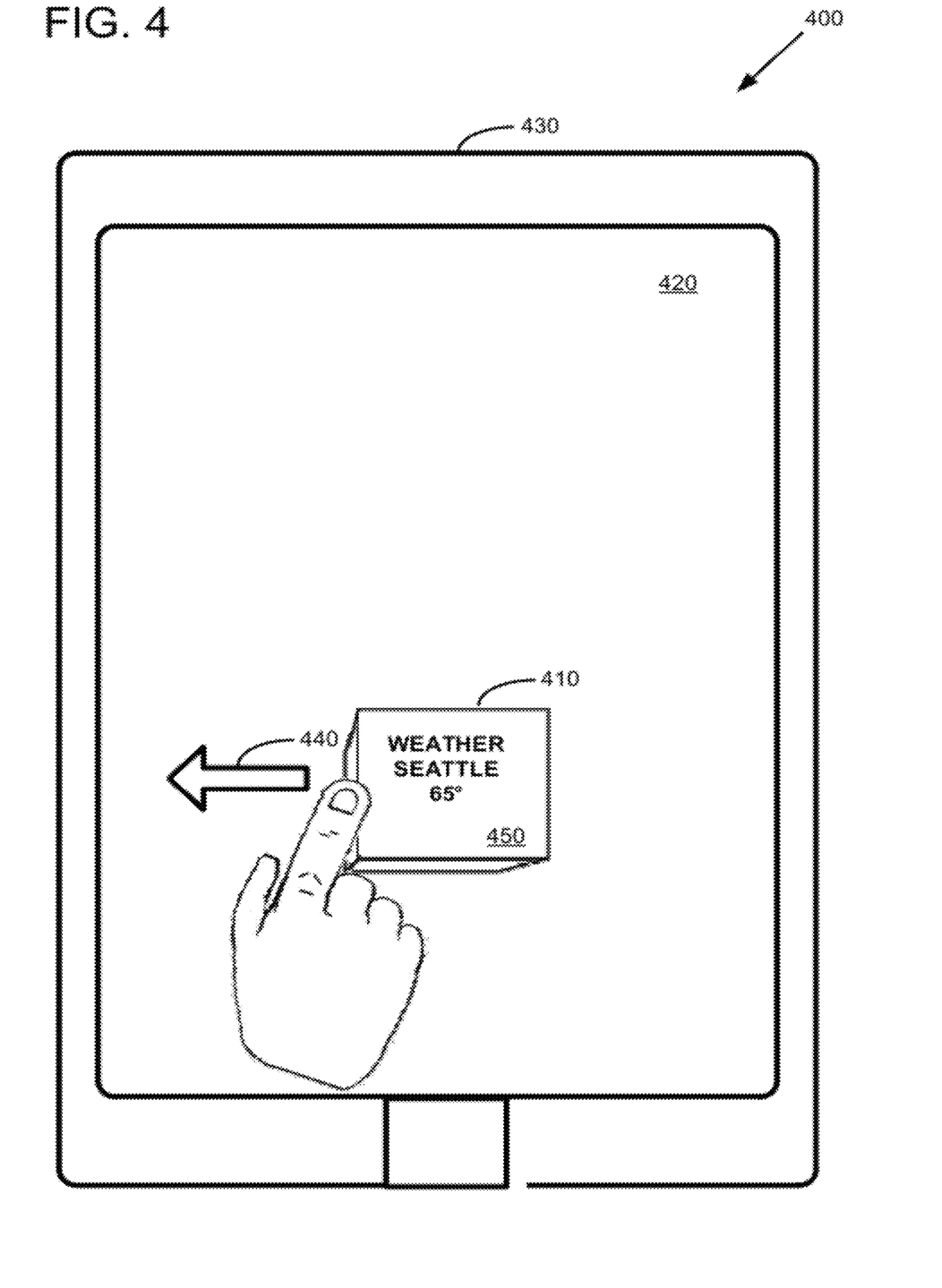
FIG. 4 illustrates an embodiment of a three-dimensional dynamic icon with multiple panels that can be updated and with the user actively rotating the icon.

FIG. 4 is an example of a three-dimensional dynamic icon 410 on a default screen 420 of a mobile phone 430. The three-dimensional dynamic icon 410 includes multiple panels that come into view when the icon is rotated. Although the three-dimensional icon is shown as a cube, it can take other forms, such as a cylinder, or any other three-dimensional geometric shape, wherein the dynamic panels are the faces of the three-dimensional shape. As shown by direction arrow 440, the user can slide a finger across the touch screen of the mobile phone in order to rotate the three-dimensional dynamic icon 410. Currently, panel 450 displaying Seattle weather is displayed.

Figure 5:
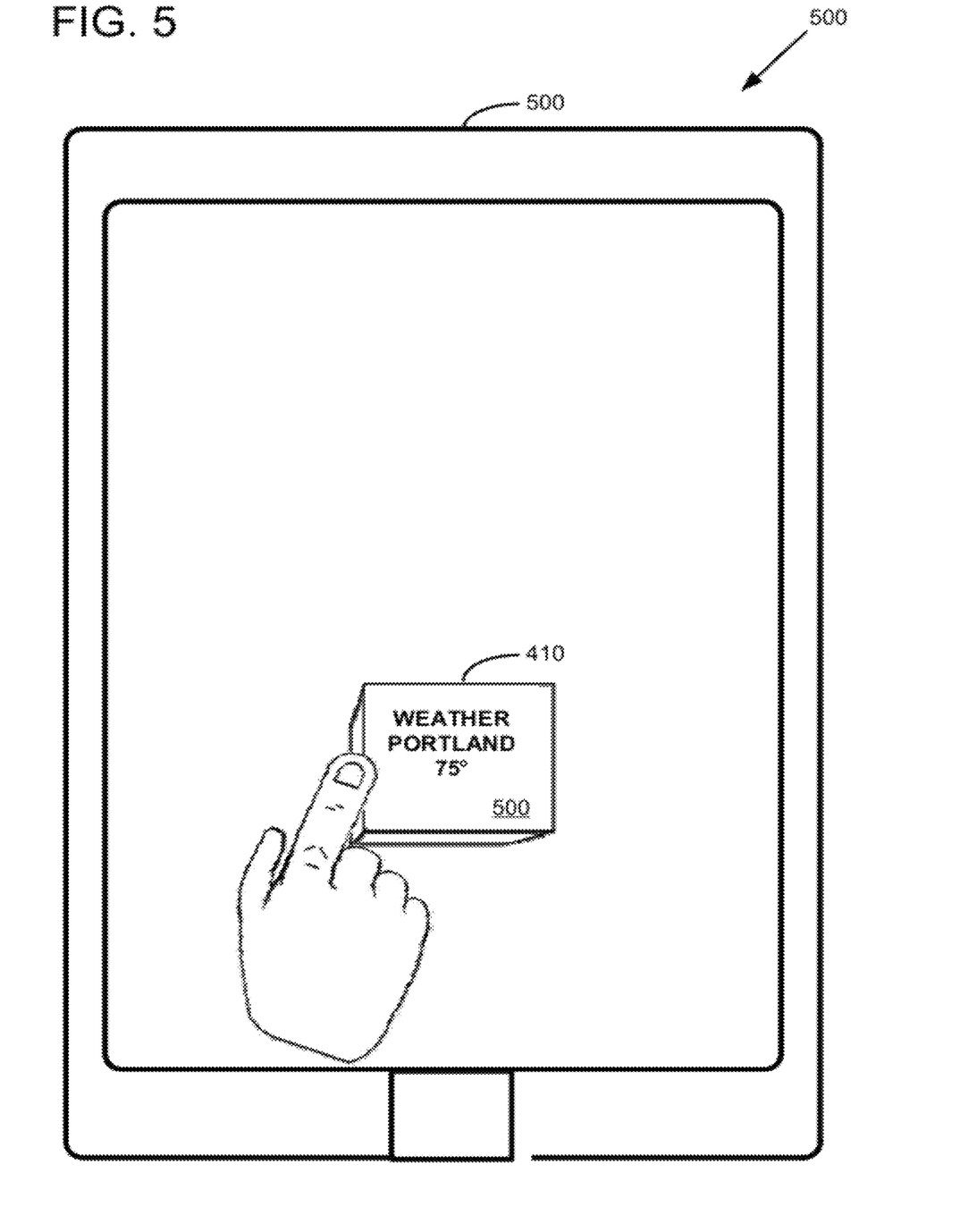
FIG. 5 illustrates the three-dimensional icon of FIG. 4 after rotation, with a different panel being viewed.

FIG. 5 shows the three-dimensional icon 410, with panel 500 displayed after the rotation. The panel 500 has different content displayed than the panel 450 of FIG. 4. Indeed, each panel associated with the application can have different content and can be individually identified by a push notification for independent updating. As with any of the embodiments described herein, any number of panels can be associated with a single application.

Figure 6:
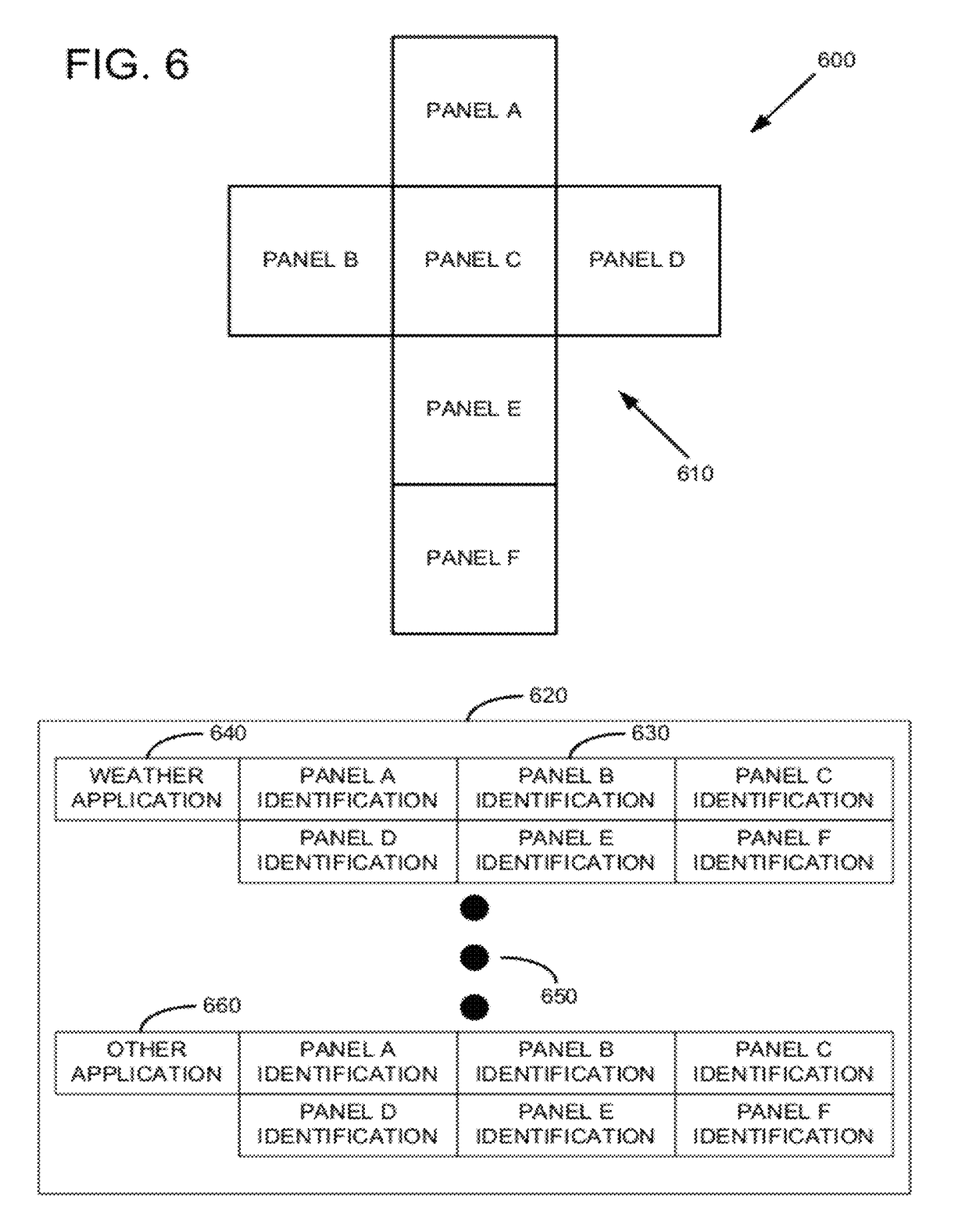
FIG. 6 illustrates different panels of FIG. 4 in a two-dimensional representation and an associated database showing identification for each of the panels.

FIG. 6 shows the three-dimensional icon 410 flattened into a two-dimensional object 600 with all of the panels 610 displayed. The panels are labeled as Panels A-F. A corresponding database 620 is shown with each panel assigned an identification, shown generally at 630. The identifications 630 are linked to an associated application 640. As shown by dots 650, other applications, such as shown at 660, can also have dynamic icons with multiple independently updatable panels associated therewith.

Figure 7:
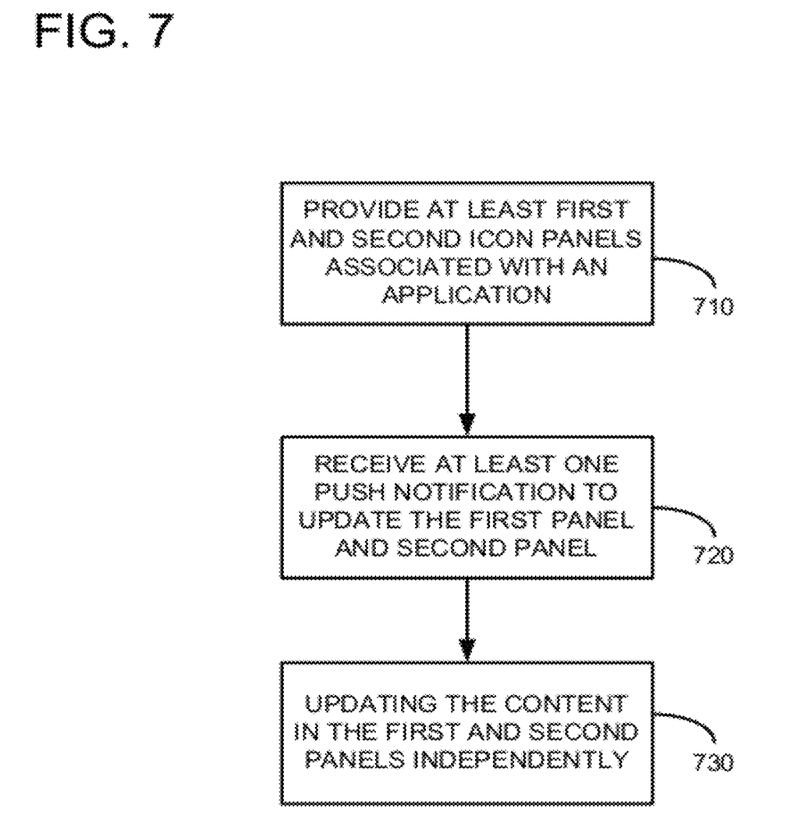
FIG. 7 is a flowchart of a method for updating multiple panels independently.

FIG. 7 shows a flowchart of a method for updating panels of an application individually. In process block 710, at least first and second icon panels are associated with a single application. In process block 720, at least one push notification is received to update the first panel and the second panel. The push notification can be a single push notification with two separate identifiers to identify each panel individually or there can be separate push notifications (e.g., first and second push notifications) to update content on each panel separately. In process block 730, the content of the first and second panels are updated independently.

Figure 8:
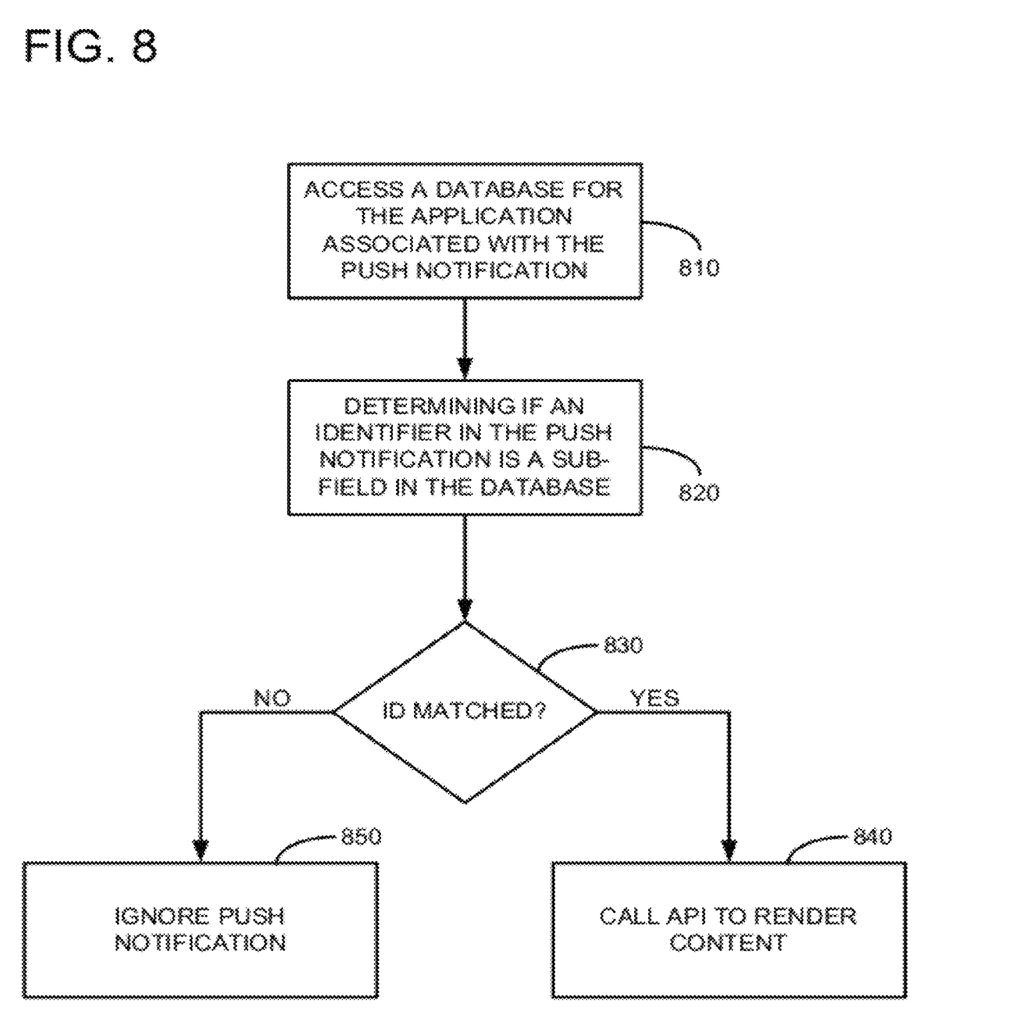
FIG. 8 is a flowchart of a method after receipt of a push notification.

FIG. 8 is a flowchart of an embodiment of a method providing further details of how to implement updating content on the panels independently. In process block 810, once the push notification is received, a database can be accessed. For example, depending on a channel associated with the push notification, an application's associated fields can be accessed by searching for the application in the database. In process block 820, an identifier associated with the push notification is extracted therefrom and is compared to sub-fields in the database to determine if there is an identifier in the database that matches the identifier in the push notification. In decision block 830, if there is a match, then an API is called (process block 840) in order to render the content provided in the push notification. If there is not a match, then the push notification is ignored (process block 850).

Figure 9:
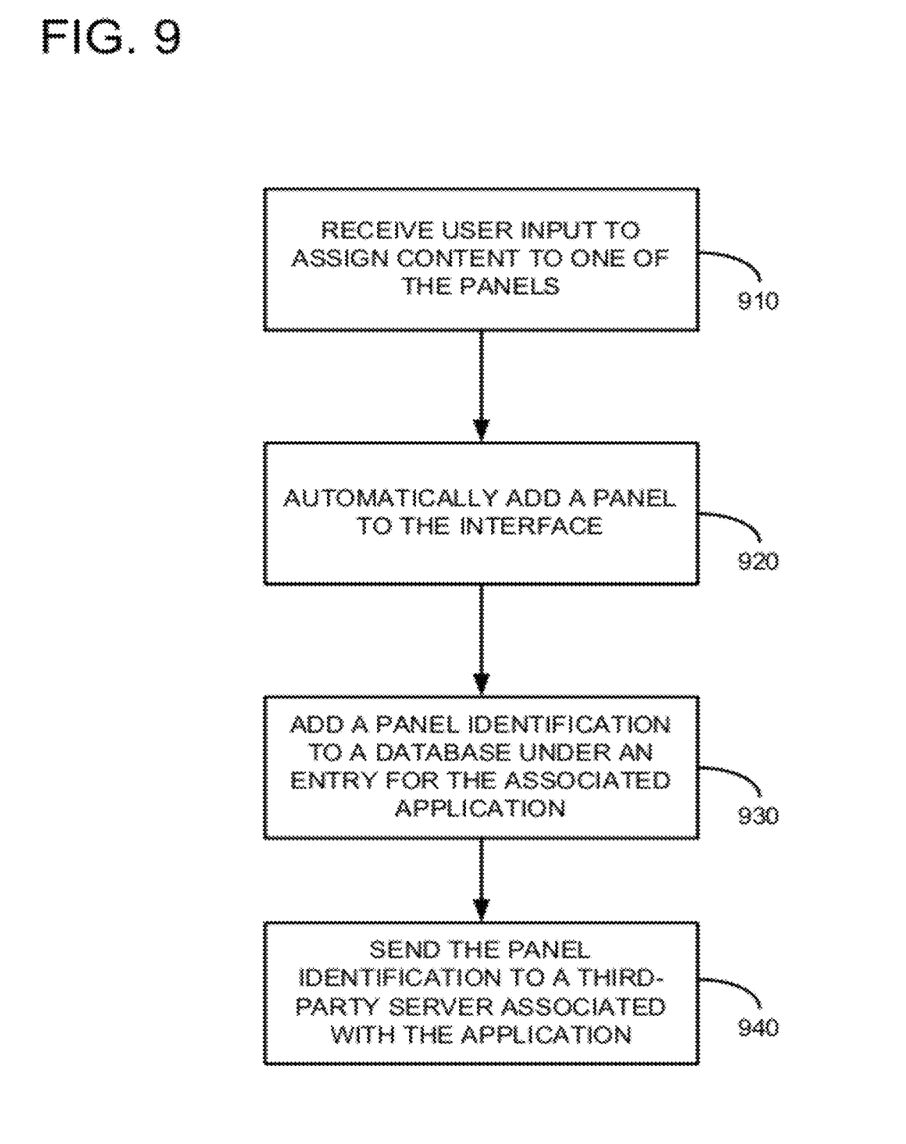
FIG. 9 is a flowchart of a method for assigning a panel.

FIG. 9 is a flowchart of an embodiment of a method for adding a dynamic panel to the user interface. In process block 910, user input is received to assign content to one of the panels of a dynamic icon or to add a dynamic icon to the display. Example user input can be the user selecting content updates associated with an application. In process block 920, a panel is automatically added to the user interface. The panel can be a two-dimensional dynamic icon or a panel of a three-dimensional, rotatable dynamic icon. In process block 930, a panel identification is added to a database under an entry associated with the application. The panel identification identifies or points to the panel that was added to the user interface. In process block 940, the panel identification is sent to a third-party server associated with the application. Thus, when the third-party server wants to update content on the dynamic panel, it can do so using the panel identification.

Figure 10:
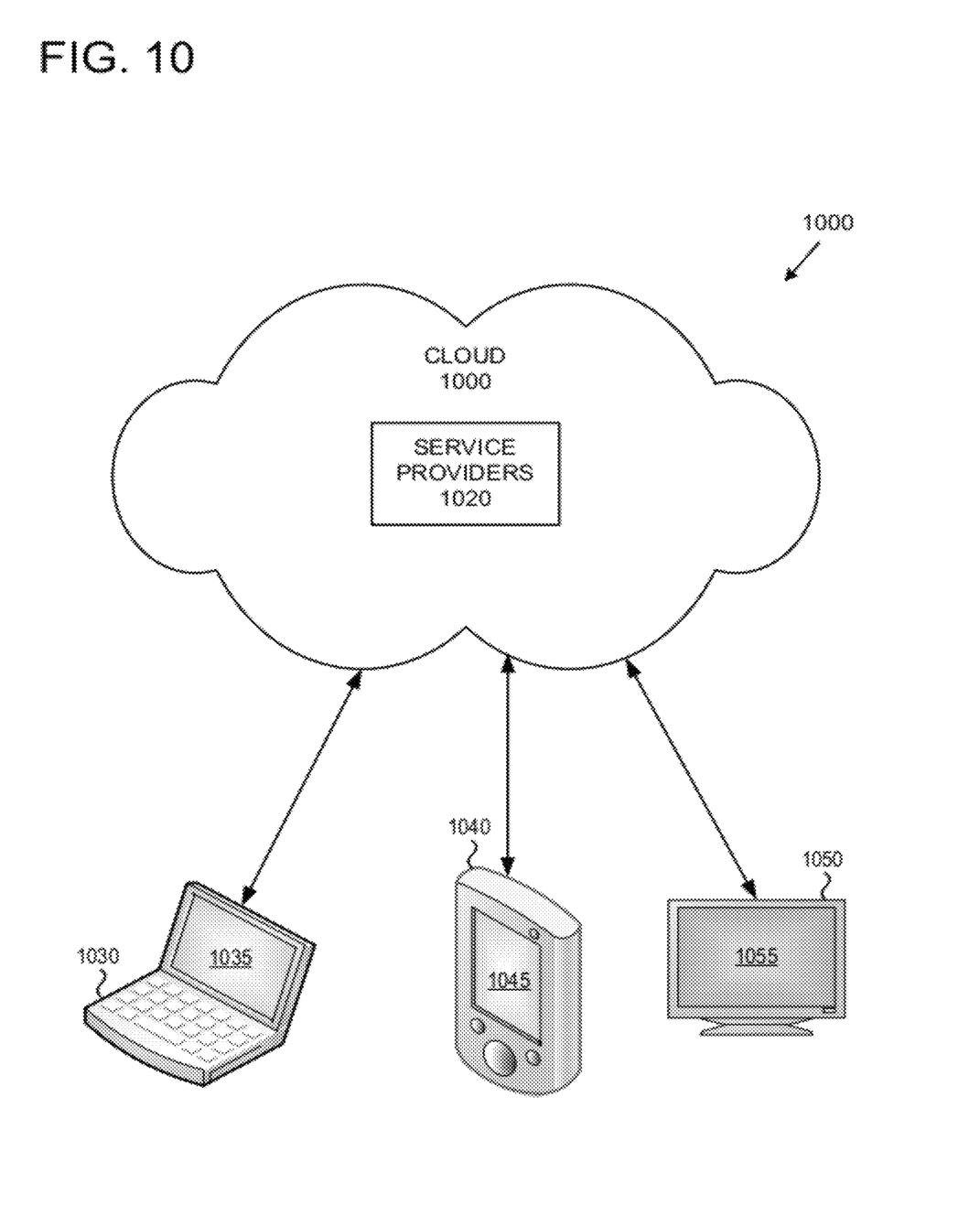
FIG. 10 is an embodiment wherein updates can be extended to a networked environment.

FIG. 10 illustrates a generalized example of a suitable implementation environment 1000 in which described embodiments, techniques, and technologies may be implemented.

In example environment 1000, various types of services (e.g., computing services) are provided by a cloud 1010. For example, the cloud 1010 can comprise a collection of computing devices 1030, 1040, 1050, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010. For example, a database with the panel identifications can be stored in the cloud 1000. Additionally, all content updates can come from the cloud and be provided across all devices so that all of the connected devices have a similar user interface including similar dynamic icons.

In example environment 1000, the cloud 1010 provides services for connected devices 1030, 1040 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A method of updating a computing device, comprising:
providing at least first and second icon panels associated with a single application; and
updating content received in at least one push notification on the first and second icon panels independently of each other, wherein the updating includes:
receiving a first push notification associated with the single application, the first push notification including a first identifier of the first icon panel to be updated and content to be added to the first icon panel; and
receiving a second push notification associated with the single application, the second push notification including a second identifier of the second icon panel to be updated and content to be added to the second icon panel.

2. The method of claim 1, wherein the first and second icon panels are separate substantially two-dimensional icons located on a display of the computing device.

3. The method of claim 1, wherein the first and second icon panels are separate panels of a multi-panel, three-dimensional icon.

4. The method of claim 1, further including updating the first and second icon panels without the associated application being opened.

5. The method of claim 1, further including receiving a selection from a user to add the second icon panel to be updated, assigning an identifier thereto in response to the selection, and sending the assigned identifier to a third party push-notification server that services the application.

6. The method of claim 1, further including:
storing the first and second identifiers in a database associated with the application;
upon receiving the first push notification, accessing the database for the application and determining if the first identifier is associated with the application;
wherein the updating only occurs if the first identifier is determined to be associated with the application.

7. A computer-readable storage having instructions thereon for implementing a method of updating a computing device, the method comprising:
providing at least first and second icon panels associated with a single application; and
updating content received in at least one push notification on the first and second icon panels independently of each other, wherein the updating includes:
receiving a first push notification associated with the single application, the first push notification including a first identifier of the first icon panel to be updated and content to be added to the first icon panel; and
receiving a second push notification associated with the single application, the second push notification including a second identifier of the second icon panel to be updated and content to be added to the second icon panel.

8. A method of updating a mobile phone, comprising:
providing an application having two or more dynamic icon panels associated therewith;
receiving at least one push notification that independently identifies content updates to be applied to the two or more dynamic icon panels so that each dynamic icon panel associated with the same application can be updated independently of the other dynamic icon panel or dynamic icon panels; and
in response to the received at least one push notification, updating the two or more dynamic icon panels so that different content is displayed on each dynamic icon panel.

9. The method of claim 8, wherein the two or more dynamic icon panels are on separate icons or a single, multi-dimensional dynamic icon having two or more panels.

10. The method of claim 8, wherein at least one push notification includes a dynamic icon identification and the content identified in the push notification.

11. The method of claim 10, wherein at least one push notification further includes a panel associated with the dynamic icon identification.

12. The method of claim 10, further including checking a database to determine if the dynamic icon identification is located in the database and, if so, rendering the content in the push notification using an application programming interface.

13. The method of claim 8, wherein the dynamic icons or the two or more panels are updated while the application is closed.

14. The method of claim 8, further including receiving user input to assign content to one of the dynamic icon panels.

15. The method of claim 14, further including sending information about the assignment of content to a server computer that issues the push notification.

16. The method of claim 8, wherein the updating is performed by a client service within the operating system.

17. The method of claim 15, wherein the client service uses an API to render content from the push notification on one of the dynamic icons or one of the panels having an identification that matches that in the push notification.

* * * * *